(12) United States Patent
Hsu et al.

(10) Patent No.: US 8,528,087 B2
(45) Date of Patent: Sep. 3, 2013

(54) METHODS FOR COMBATING MALICIOUS SOFTWARE

(75) Inventors: Stephen Dao Hui Hsu, Eugene, OR (US); James Noshir Hormuzdiar, Hayward, CA (US)

(73) Assignee: Robot Genius, Inc., Oakland, CA (US)

( * ) Notice: Subject to any disclaimer, the term of this patent is extended or adjusted under 35 U.S.C. 154(b) by 1769 days.

(21) Appl. No.: 11/414,741

(22) Filed: Apr. 27, 2006

(65) Prior Publication Data

US 2009/0077664 A1    Mar. 19, 2009

(51) Int. Cl.
    *G06F 21/00*    (2006.01)
(52) U.S. Cl.
    USPC ............... 726/23; 711/163; 726/25; 726/26
(58) Field of Classification Search
    USPC ..................................... 726/22–24
    See application file for complete search history.

(56) References Cited

U.S. PATENT DOCUMENTS

| | | | | |
|---|---|---|---|---|
| 7,356,843 | B1 * | 4/2008 | Kingsford | 726/22 |
| 7,389,539 | B1 * | 6/2008 | Kouznetsov | 726/22 |
| 2003/0159070 | A1 * | 8/2003 | Mayer et al. | 713/201 |
| 2003/0172293 | A1 * | 9/2003 | Johnson et al. | 713/200 |
| 2005/0091192 | A1 * | 4/2005 | Probert et al. | 707/1 |
| 2005/0155031 | A1 | 7/2005 | Wang et al. | 717/170 |
| 2005/0182964 | A1 * | 8/2005 | Jooste | 713/200 |
| 2006/0026684 | A1 * | 2/2006 | Harvey et al. | 726/23 |
| 2007/0028304 | A1 * | 2/2007 | Brennan | 726/24 |
| 2007/0067843 | A1 * | 3/2007 | Williamson et al. | 726/24 |
| 2007/0234062 | A1 * | 10/2007 | Friedline | 713/183 |

OTHER PUBLICATIONS

Kerivan, John E. Heuristic Security-Testing Methods, Journal of Digital Forensic Practice, Mar. 2006. pp. 1-15.*
Kristenson, The Big Picture on Big Holes, Network Security, Nov. 2003. pp. 15-17.*
Yin et al., "Selecting Log Data Sources to Correlate Attack Traces for Computer Network Security: Preliminary Results", Proc. of the 11th Intl. Conf. on Telecommunication Systems Modelling, and Analysis (ITCSM11), U.S. Naval Postgraduate School, 2003.
Nguyen et al., "Detecting Insider Threats by Monitoring System Call Activity", Proceedings of the 2003 IEEE Workshop on Information Assurance, United States Military Academy, West Point, NY, Jun. 2001.
Banikazemi et al., "Storage-Based Intrusion Detection for Storage Area Networks (SANs)", Proceedings of the 22nd IEEE/13th NASA Goddard Conference on Mass Storage Systems and Technologies (MSST), 2005.
Xie et al., "Seurat: A Pointillist Approach to Anomaly Detection", Proc. of The Seventh International Symposium on Recent Advances in Intrusion Detection (RAID), Sep. 2004.

* cited by examiner

*Primary Examiner* — Hadi Armouche
(74) *Attorney, Agent, or Firm* — Lumen Patent Firm

(57) ABSTRACT

A method for combating malware monitors all attempts by any software executing on a computer to write data to the computer's digital storage medium and records details of the attempts in a system database having a causal tree structure. The method also intercepts unauthorized attempts by executing objects to modify the memory allocated to other executing objects or to modify a selected set of protected objects stored on the digital storage medium, and may also intercept write attempts by executing objects that have a buffer overflow or that are executing in a data segment of memory. The method may include a procedure for switching the computer into a quasi-safe mode that disables all non-essential processes. Preferably, the database is automatically organized into software packages classified by malware threat level. Entire or packages or portions thereof may be easily selected and neutralized by a local or remote user.

61 Claims, 5 Drawing Sheets

FIG. 3A
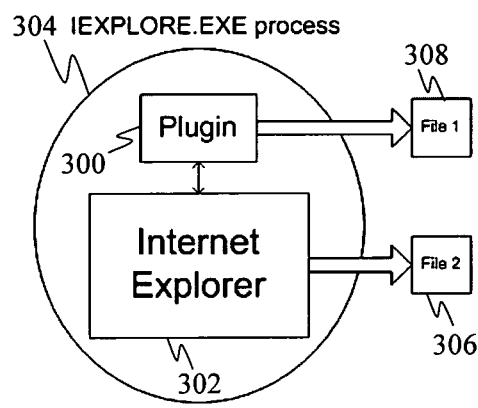
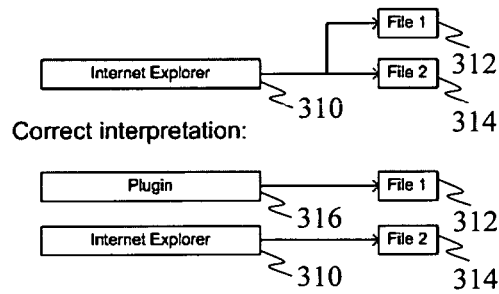
FIG. 3B

METHODS FOR COMBATING MALICIOUS SOFTWARE

FIELD OF THE INVENTION

The present invention relates generally to computer security software. More specifically, it relates to methods for combating malicious software on computer systems.

BACKGROUND OF THE INVENTION

Malicious software (malware) is software designed to perform functions contrary to the interests of a computer's user. Examples of malware are viruses, worms, spyware, and trojans. When executed, malware may perform a variety of unwanted actions including, for example, generating pop-up windows containing advertisements, sending copies of the malware to e-mail addresses in the user's address book, secretly collecting and sending user information to third parties, or disabling network security settings to allow unauthorized remote access to the computer, to name just a few. Not only does malware consume computer resources and disrupt normal use of the computer, but it often can serve more nefarious purposes as well. For example, malware can compromise financial account information or turn the computer into a zombie that can be remotely controlled to unwittingly send spam or participate in coordinated DNS attacks.

Typically, malware installed on a computer is intentionally designed to be difficult to detect and remove. For example, in computers running a version of the Microsoft Windows operating system, malware often takes advantage of weak policing mechanisms of the Microsoft Installer by installing its executables and plug-ins on the computer without registering them. Once the user realizes that malware has been installed, there is no clear record of what has been installed or what havoc it has created.

A common approach of existing anti-virus software is to scan system files for signs of known malware. To be effective, this approach requires an up-to-date database containing unique, detectable signatures for every form of malware. Constructing, maintaining, and distributing such databases, however, is costly, labor-intensive, and complicated. It requires performing detailed investigations of every known form of malware, constructing signatures that uniquely identify each type of malware, collecting the signatures in a database, and periodically updating the databases on all computers running the anti-virus software. To make matters worse, existing forms of malware are constantly mutating and entirely new types of malware regularly emerge. As a result, this type of anti-virus software does not detect or neutralize the newest forms of malware.

Another approach to combating malware is anomaly detection software. Rather than searching files for traces of malware, these programs monitor system activity and attempt to distinguish anomalous patterns of activity from normal patterns. The software can then warn the user of anomalous system activity that indicates the likely presence of malware. Although anomaly detection can be effective in fighting malware, it can be tedious and complicated to properly set up and use. For example, if the warning level is too sensitive, the user will be irritated by false positives. A warning level that is not sensitive enough, however, will allow malicious activity to go undetected. This approach is also undermined by the constant adaptation of malware that is designed to produce activity patterns that are sufficiently similar to legitimate software so that the malware escapes detection. Moreover, even if anomalous activity is appropriately detected, the problem remains how to identify and neutralize the specific malware producing the anomalous activity.

US Patent Application Publication 2005/0091192 discloses a technique for tracking file creation on a computer and storing a list of files associated with an application program or operating system. The list thus provides an association of created files with application programs responsible for creating them. The list may be used to help reduce installation errors and facilitate removal of software, including malware. However, many forms of malware elude detection and remain hidden from conventional file system filters. For example, malware is notorious for concealing and/or obfuscating traces of its installation and operation. In particular, malware often exploits vulnerabilities in pre-existing software in order to secretly and illicitly install itself under the guise of another legitimate program. Consequently, malware is often not detected by conventional file system filters, resulting in an inaccurate and incomplete record of file creation. Conventional file system filters are also vulnerable to direct attacks by malware. For example, malware can modify the file list in order to remove traces of detection, or it can modify or disable the file system filter itself in order to escape detection altogether. Without effective means for reliably detecting malware using such file system filters, it can not be easily disabled or removed.

In view of the above, it would be an advance in the art of computer security to overcome the above disadvantages and provide better techniques for combating malware.

SUMMARY OF THE INVENTION

In one aspect, the present invention provides a computer-implemented method for combating malware on a computer. The method may take the form of security software that monitors all attempts by any software executing on the computer to write data to the digital storage medium and records details of the attempts in a system database, e.g., using a file system filter installed at a driver level of the operating system. The system database preferably has a causal tree structure (e.g., stored in XML format), where branch points represent objects from which derivative objects are created and leaves or end-points represent objects that have no derivative object. To help ensure accuracy and integrity of the database, the security software intercepts unauthorized modification by executing objects to the memory allocated to other executing objects (e.g., using a kernel-level process filter or modified API call), and it also intercepts unauthorized attempts by executing objects to modify a selected set of protected objects stored on the digital storage medium. The protected objects preferably include the security software, the database, as well as other files used by the security software. In some embodiments, the protected objects also include objects associated with the operating system of the computer and/or objects associated with selected application programs installed on the computer.

In some embodiments, the security software intercepts attempts to write to any objects whenever the executing object initiating the attempt has a buffer overflow, e.g., by checking a system call stack for signs of corruption indicative of a buffer overflow condition. The software may also intercept attempts to open pop-up windows whenever the executing object initiating the attempt has a buffer overflow. Additionally, the software may intercept attempts to write to any objects whenever the executing object initiating the attempt exists in a data segment of memory.

The security software may also prevent unauthorized attempts to neutralize a protected driver (such as the security software itself), e.g., by modifying API calls to prevent unauthorized registry changes. The security software may also intercept unauthorized attempts to install other file system filters (i.e., executables that intercept attempts to write data to the digital storage medium). For example, prior to allowing installation of any file system filter, the security software can check for a digital signature from an authorized entity.

The security software may record details of the attempts to write data by recording a first object identifier (e.g., file name of a program) corresponding to an executable object attempting to write the data and a second object identifier (e.g., file name) corresponding to a target object stored on the digital storage medium that the executable object is attempting to write data to. In addition, the software may also record a third object identifier corresponding to a parent executable that initiated execution of the executable object attempting to write the data. The third object identifier, for example, may be an executable that invokes a language interpreter and causes it to run a script. The third object identifier maybe recorded in the system database as the parent of the second object identifier. In addition to recording details of write attempts, the security software may automatically back up objects stored on the digital storage medium prior to modifying the objects. Thus, the security software may subsequently use such backups to restore objects stored on the digital storage medium to a state prior to modification.

Embodiments of the security software preferably organize the system database into software packages comprising groups of associated objects. A new software package may be identified by the security software when any of various events take place, e.g., an object is downloaded over a network and executed, an object is copied from an external digital storage medium and executed, a package manager creates a collection of installed objects, an executable object installs itself, an object registers itself with a package manager, or a first object unassociated with any existing package creates a second object that is executed. An new object may be associated with an existing package, on the other hand, if any of various events take place, e.g., another object in the existing software package created the new object.

The organization of the database into software packages may also include positively identifying packages by comparing the system database with a reference database containing known software packages and associated objects. Preferably, the reference database has a causal tree structure. It may be stored locally, and/or on one or more remote computers. The comparison may be based on any of various types of comparisons including file names, hashes of files, URL origins of files. The positive identification of a package preferably also includes assigning a recognizable name to the package from the reference database that the package matches. Additionally, the packages may be classified according to malware threat level. For example, a software package may be categorized as suspected malware if an object in the software package attempts to modify a memory space assigned to another executing object, if the object is not part of a software package registered with the operating system, or if the object does not have properties that conform to a predetermined profile for the software package.

In some embodiments, the security software includes a procedure that switches the computer to a quasi-safe mode that restricts execution of a selected collection of objects, e.g., all objects not required for basic functioning of the operating system. This quasi-safe mode may be activated, for example, by killing executing objects in the selected collection and/or preventing initiation of execution of any executable objects in the selected collection. The security software preferably includes a procedure for neutralizing a selected collection of objects. The neutralization may involve, for example, moving or deleting indirect links to objects, moving objects to a quarantined location, or deleting objects.

Embodiments of the security software may also include remote communication and/or control, e.g., transmitting system database information (such as information about installed packages or suspected malware) to a remote computer and/or receiving and executing a command from a remote computer (such as a command to remove a software package from the computer or a command to search the computer for objects matching a specified malware profile).

The security software preferably provides a user interface that displays a set of commands and selectable representations of objects in the system database, allowing a user to select a set of database objects and activate one of the commands. The objects from the system database may be displayed in any number of useful views, e.g., in an expandable tree structure allowing portions of the tree to be revealed and hidden by a user, or in a flat, linear structure. The items in the views may preferably be sorted, grouped, or organized according to one or more criteria such as, for example, software package, malware threat classification, file name, file type, and/or creation date.

Some embodiments of the security software may also include tools such as a window inspector tool that displays an identity of an executing process and associated software package that created a displayed item currently being selected by a user.

BRIEF DESCRIPTION OF THE DRAWINGS

FIGS. 3A and 3B are schematic diagrams illustrating, respectively, how a browser plugin can hide within a browser executable and the correct and incorrect interpretations of the relationships between the files created by such a plugin and the browser process.

DETAILED DESCRIPTION

Figure 1:
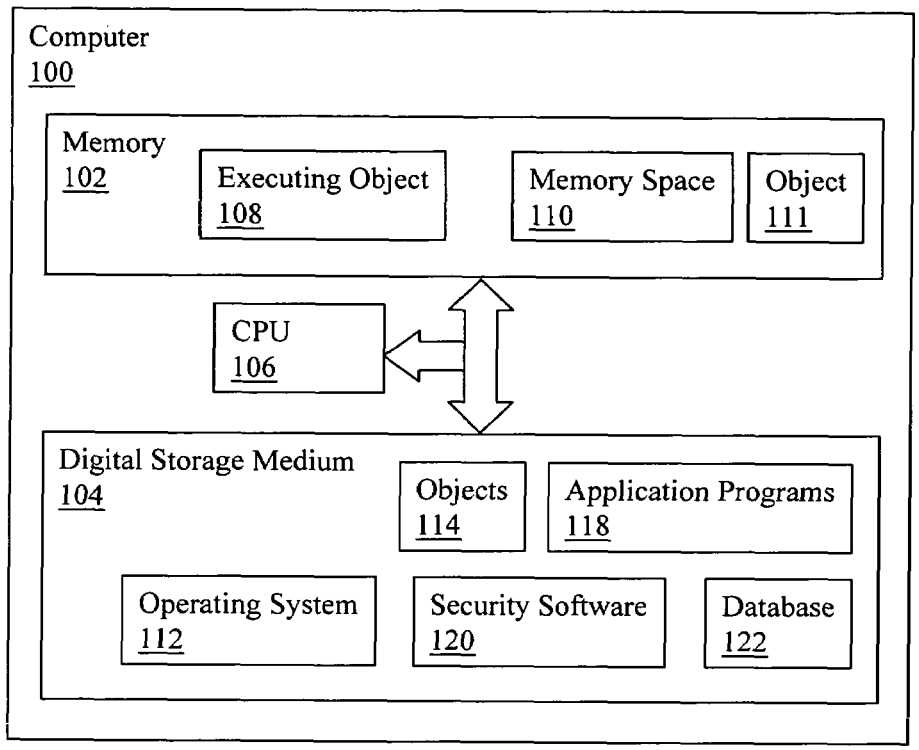
FIG. 1 is a schematic diagram illustrating components of a computer system having security software and file system database in accordance with an embodiment of the invention.

Although the present invention may be implemented in various computer systems using any of several operating systems, for purposes of illustration the following description will present the principles of the invention as implemented in the context of a desktop computer running a version of the Microsoft Windows operating system (often referred to simply as "Windows"). Those skilled in the art will recognize, however, that the present invention is not limited to this particular computing platform, but may also be implemented in computers running other operating systems including, for example, Unix and Unix-like variants such as Linux, BSD, Solaris, and Mac OS X.

DEFINITIONS

The following definitions will be used in the context of this application:

Computer: an electronic computing device with a CPU, memory, and a digital storage medium, including desk-top computers, lap-top computers, and hand-held devices on which software can be installed and executed.

Objects: individual objects (e.g., files, executables, registry elements, DLLs, or other data structures) or composite objects (e.g., drivers composed of sys file and registry keys, corn objects, and services composed of multiple individual objects) stored on the digital storage medium.

Executable object: an object such as executable code, driver, DLL (Windows executable code linked in at execution time), or shared object.

Derivative object: an object created from another object. A derivative object may be created directly by an executable object (e.g., an application program that creates a file, or an installation program that creates an executable object) or may be created indirectly from a non-executable object (e.g., a collection of files derived from a zip archive).

Software: A collection of one or more executable objects and possibly other associated objects that can be executed on a computer.

Software Installation The storage of software onto a computer in a manner such that it can be executed. Installation of software is often, but not necessarily, accompanied by registration of the software with the operating system (e.g., using a package manager such as RPM or MSI.exe).Package: any collection of objects associated with, or derived directly from, a single software installation.

Process: an actively executing program assigned its own isolated memory space. Injection: the act of one process writing into the memory space of another process, perhaps attempting to execute injected code.

System database: an organized collection of data, not necessarily limited to some more restricted senses of "database" (e.g., could be flat file).

API Call: execution of an operating system function available for programs to execute through an application programming interface (API).

Modified API Call: modification of the operating system function of an API call by various means including, for example, Hooking (i.e., redirecting the API call to execute code that returns control to the API call sometime during execution), Callback (i.e., requesting that the API call turn control over to specified code sometime during execution), or an OS function re-write (i.e., modify the operating system code of the function executed by the API call).

Neutralize: making it unlikely or impossible that software will be executed in the future. Software can be neutralized by various means including, for example, deleting or moving auto-run links, menu items, auto-run registry keys, desktop or menu item short-cuts, or other items that may be used to launch the software, moving the software executable to a quarantine area where it can not be executed, and/or deleting the software.

System Overview

In one embodiment, the invention is preferably implemented on a computer 100 having a memory 102, digital storage medium 104, and CPU 106, as shown in FIG. 1.

Digital storage medium 104 typically stores data objects such as operating system 112, application programs 118 and other executable or non-executable objects 114. As part of the normal operation of computer 100, portions of the operating system 112, application programs 118, and other executable objects may be loaded into memory 102 and executed by CPU 106. In addition, the digital storage medium 104 of computer 100 may also contain security software 120 and associated database 122. An implementation of security software 120 may include, for example, as a driver-level security module (also called a file system filter) that is positioned between operating system API calls and the media storage device, so that all file modifications must pass through the security module. Like other drivers, the security module is loaded into memory 102 at system start-up and executed in the background, independent of other software applications or executables. The driver-level security module, for example, could modify or replace device drivers for the computer's primary digital storage medium, such as an internal hard disk drive. Although the security module is preferably located in system or kernel space, there is no inherent reason it could not be located in user space. The security module may be implemented at the driver level, as discussed above, or could be implemented in various other ways. For example, it could be implemented using a modified API call.

During operation, the security module in security software 120 monitors all attempts by any software executing on the computer to write data to objects stored on digital storage medium 104. For example, in the event that executing object 108 attempts to create or modify objects 114, then security software 120 will obtain information about the attempt and record the information in database 112. The recorded information may include, for example, an object identifier such as the name of executing object 108 which initiated the attempt, as well as an object identifier such as the name of one or more objects 114. In addition, security software 120 may also, in appropriate circumstances, intercept the attempt and prevent the executing object from modifying or creating objects 114.

Figure 2:
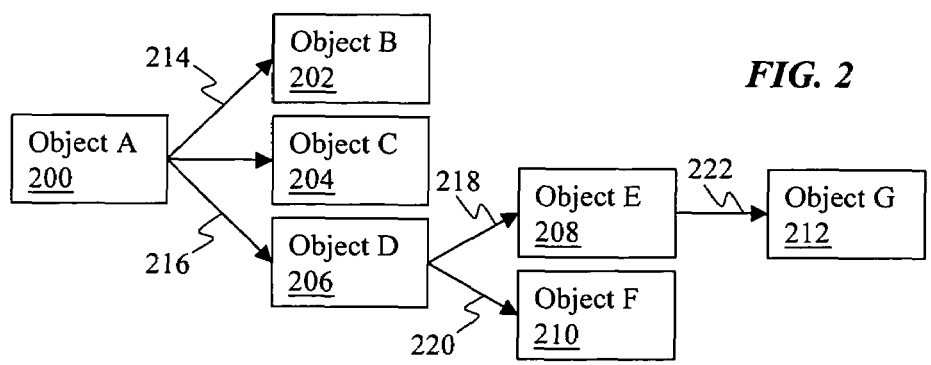
FIG. 2 is a schematic diagram illustrating an example of a collection of files having a causal tree structure in accordance with an embodiment of the invention.

The system database has a causal tree structure, as illustrated in FIG. 2, and may be stored in any one of many possible structured data formats, such as XML. The nodes, or branch points, of the tree correspond to data objects while the arrows connecting the objects indicate the causal derivation of child objects from parent objects. For example, in the particular causal tree structure shown in FIG. 2, Object A 200 is the efficient cause of three derivative objects: Object B 202, Object C 204, and Object D 206. In turn, Object D 206, is the agent that causes the creation of derivative Object E 208 and Object F 210. Finally, Object E 208 has derivative object G 212. A tree such as this might result, for example, if a web browser application (Object A) creates a bookmarks file (Object B), a cache (Object C), and a downloaded file (Object D). The bookmarks and cache do not result in the creation of any derivative files, so they are end-nodes, or leaves, in the causal tree structure. However, a downloaded file (Object D) such as a zip archive may be opened and its contents extracted to give rise to an executable installer program (Object E) and associated resource files (Object F). When it is run, the executable installer (Object E) then installs a game program (Object G) on the computer. Each of these steps is monitored and recorded by the security software security module in the system database. In addition to recording information about each of the objects, the database also records the causal relationships between them. For example, the database records the direct derivation 214 of Object B from Object A and the direct derivation 216 of Object D from Object A. It also includes the direct derivation 218 of Object E from Object D, the direct derivation 220 of Object F from Object D, and the direct derivation 222 of Object G from Object E. We say that Objects B, C, and D are directly derived from Object A, while Objects E, F, and G are indirectly derived from Object A.

A major disadvantage of conventional file system filters is their inability to detect many forms of malware. Without effective detection, the file system database will not be complete and malware can not be removed. Accordingly, embodiments of the present invention include various techniques for improving the detection of malware so that the database contains an accurate record of the file system. Embodiments also include techniques for protecting the integrity of the database and security software.

Detecting Process Memory Injection

According to one embodiment of the invention, the security software improves detection of malware by intercepting unauthorized modifications to the memory allocated to executing objects. For example, in most modern operating systems, an executing object 111 (e.g., a process) is allocated an isolated memory space 110 for its exclusive use. However, in some circumstances, an executing object 108 may inject code or other data into the memory space 110 allocated to object 111. This modification of the memory assigned to one process by another process is sometimes called process memory injection. In some versions of the Windows operating system, for example, one process may write to the memory of another process using kernel APIs. In particular, dynamic linked library (DLL) injection takes place when one process inserts a library into the code of another process. For example, a predetermined list of system DLLs are routinely injected into new processes by the Windows operating system. Similarly, browser helper objects (also called browser plugins) are routinely injected into internet browsers. For example, FIG. 3A shows a plugin 300 injected into the Microsoft Internet Explorer application 302. As a consequence of the injection, the IEXPLORE.EXE process 304 appears to be responsible for creating both file 306, created by Explorer 302, as well as file 308, created by plugin 300. This obvious but incorrect interpretation is illustrated in the partial file tree shown in FIG. 3B, where the Internet Explorer process node 310 is listed in the file tree as the parent of both files 312 and 314. Consequently, the actions of the plugin are attributed to Explorer and remain hidden. This is how conventional file system filters interpret and attribute file creation in this case. The correct interpretation, in contrast, is also shown in FIG. 3B, where the Internet Explorer process node 310 is listed in the file tree as the parent of only file 314, while the plugin node 316 is listed in the file tree as the parent of file 312.

Although there are some legitimate uses of process memory injection, it is often used by malware for illicit purposes. For example, because DLLs can have functions that are automatically executed, they provide a mechanism for malware to execute code under the guise of a legitimate process, and thus remain undetected. A consequence of this is that the malware remains hidden. It is therefore useful to detect process memory injections and intercept unauthorized process memory injections.

Figure 3C:
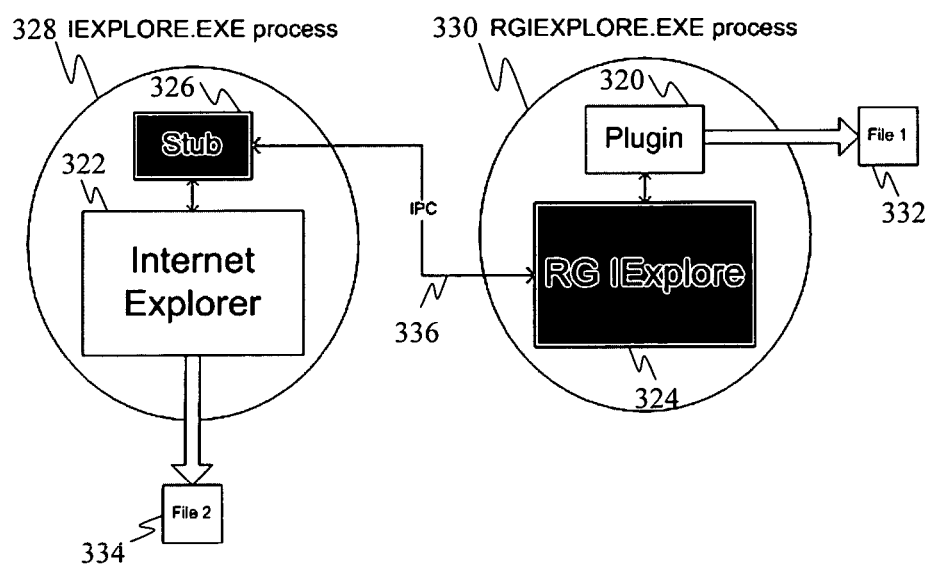
FIG. 3C is a schematic diagram illustrating a technique for detecting memory injection according to an embodiment of the invention.

There are several techniques which may be used in implementations of the present invention for detecting memory injection. According to one technique, memory injection may be detected by using a modified API call, such as an injection hook process or callback, that intercepts calls to the kernel APIs used for memory injection. For example, the Windows API call SetWindowsHookEx is normally used to perform memory injection. This API call can be modified by the security software so that process memory injections are allowed only if the call originated from an authorized process, such as an operating system process. A list of authorized processes is preferably maintained as part of the security software. Alternatively, the security software can modify the SetWindowsHookEx API call so that, rather than injecting a DLL into a target process, it creates a new process that contains the DLL and injects a substitute DLL into the target process. The substitute DLL communicates with the DLL in the new process to replicate the DLL functionality, so that the new process can monitor and intercept calls to the DLL. For example, FIG. 3C illustrates an example of this technique, which may be contrasted to FIG. 3A. When plugin 320 attempts an injection directly into Explorer 322, the attempt is intercepted by the security software. Rather than permitting the injection (which would result in the arrangement shown in FIG. 3A) the security software injects the plugin 320 into a new process RGIExplore 324 and injects a stub plugin 326 into Explorer 322. The new process RGIExplore 324 communicates with the stub 326 via inter-process communication 336, providing transparent communication between the plugin 320 and Explorer 322 to retain original plugin functionality. When Explorer 322 creates a file 334, the file creation is attributed to the IEXPLORE.EXE process 328. When the plugin 320 creates a file 332, however, the file creation is attributed to the process RGIEXPLORE.EXE 330. Consequently, the file creation and modification activities of plugin 320 are correctly attributed in the file tree to the plugin rather than to Explorer, as described above in relation to FIG. 3B.

Another technique for controlling memory injection is by using a kernel-level process filter that restricts write permissions for unauthorized new processes. For example, The Windows API call OpenProcess is normally used to set up permissions for new processes. The security software can modify this API call so it grants write access only to authorized processes. Illicit attempts to inject DLLs will be denied due to limited write access of the process attempting the injection.

Yet another approach to detecting DLL injection is to create a kernel-level thread filter to track file-modifications. A process may contain multiple threads of executing code sequences, all sharing the same memory space. When a DLL is injected, a new thread is created. Using a modified API call associated with thread creation, execution of DLL code can be monitored and intercepted.

When a memory injection is detected using any of the various possible techniques, the security software preferably authorizes the modification of memory only for executing objects that are included in a predetermined exempt list defined by the security software. This feature allows some processes that have legitimate reasons for performing memory injection to execute without interference from the security software while intercepting illicit attempts at memory injection.

Detecting Buffer Overflows and Code Running in Data Segments

Bugs and other imperfections in legitimate software running on a computer can sometimes be exploited by malware. One common exploit is a buffer overflow attack. A buffer overflow occurs when a process designed to write data to an allocated memory buffer space erroneously writes data to memory locations outside the buffer. Suitably crafted malware can sometimes intentionally trigger a buffer overflow that overwrites adjacent memory space with malicious code. If the adjacent memory space originally contained legitimate code, the buffer overflow may cause the malicious code to be executed instead. The malware thus executes under the guise of another legitimate process.

To improve detection of malware, the present invention provides techniques for detecting and intercepting buffer overflow exploits. For example, one technique is implemented as part of the security software security module that monitors all attempts to write to the media storage device. When the security module detects a write attempt, it intercepts the attempt whenever the executing object initiating the attempt has a buffer overflow condition. Another approach is to intercept write attempts whenever the operating system call stack has signs of corruption indicative of a buffer overflow condition. Another sign of a buffer overflow is the presence of code running in a segment of memory assigned to data. Accordingly, another technique includes intercepting write attempts whenever the executing object initiating the attempt exists in a data segment of memory. In addition to being used to block write attempts, these same techniques also can be advantageously used to block the opening of pop-up windows by malware.

Detecting Helper Object Malware

Figure 3D:
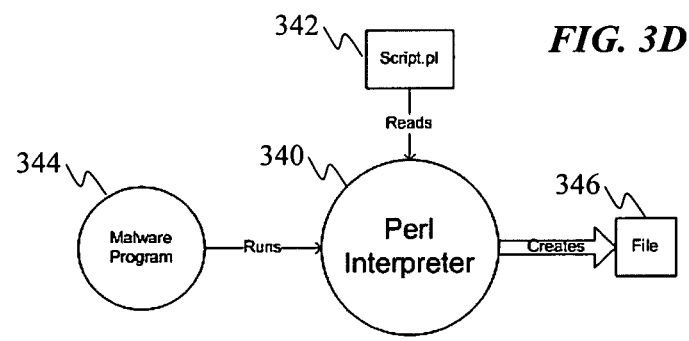
FIGS. 3D and 3E are schematic diagrams illustrating, respectively, how a malware executable can hide behind a language interpreter executable and the correct and incorrect interpretations of the relationships between the files created by the interpreter process and the malware process.
Figure 3E:
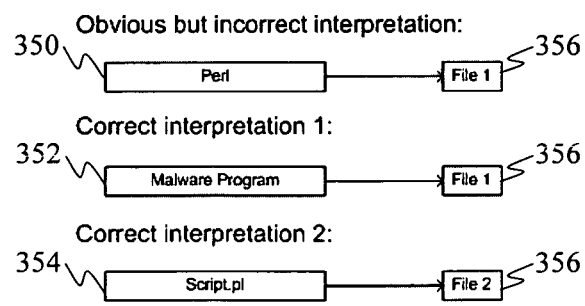

Some forms of malware conceal themselves using helper objects. Legitimate helper objects, such as a java or perl interpreter, may be invoked by a second executable and instructed to perform various actions, such as run a script. The invoking program, or the script, or both, may be malware. Consequently, helper object malware normally appears to the system as part of a legitimate helper object application and remains hidden. For example, FIG. 3D shows a malware program 344 that runs a perl interpreter 340 which reads and executes a script 342, thereby creating a file 346. As shown in FIG. 3E, a conventional file system tree would show the file 356 being a child of the perl program 350. A correct interpretation, in contrast, would show the file 356 being a child of the malware program 344 that invoked the perl interpreter 340. In some cases, malware could be limited to the script 342 which is normally executed by a legitimate invocation of the perl interpreter. In this case, the correct interpretation would be to show the file 356 as a child of the script 354, as indicated in the figure. Other malware uses system API calls (e.g., addfile, runDLL) to indirectly create files and indirectly perform other actions. Accordingly, embodiments of the present invention include techniques for improving the detection of helper object malware and similar forms of malware that execute by a second executable.

In one such technique, when the security software security module records details of write attempts in the database, in addition to recording an object identifier that is directly responsible for the write attempt, the security module also records a parent object identifier of an associated object that is causally linked to the execution of the first object identifier. For example, FIG. 3D illustrates a helper object 340 and its parent objects 344 and 342 cooperating in an attempt to write to file 346. In this example, the object is a language interpreter and the parent object is an executable that invokes the language interpreter and/or a script that is executed by the language interpreter. In some cases, the associated parent object may not be an immediate parent, but could be a grandparent, great-grandparent, etc. To facilitate the identification of the helper objects and parent objects, the security software may maintain a list of API functions (e.g., addfile, runDLL) often used by malware, a list of suspicious and/or legitimate helper objects, a list of language interpreters, and other information useful in identifying helper objects.

Some forms of malware are notorious for generating popup windows. To facilitate the detection of these forms of malware, embodiments of the security software may implement a modification of the system API call to open a window. The security software intercepts these calls and attempts to identify the location in memory from which the call originated, and use this location to identify the corresponding DLL responsible for the call. Identifying the parent object may involve searching several layers of the system stack (which holds return addresses) to trace back to the object ultimately responsible Protecting the Security Software, Database, and Other Objects Preferably, embodiments of the security software include techniques to protect the integrity of the security software and file system database. Aggressive forms of malware may intentionally or inadvertently act to disrupt the normal functioning of the security software and/or compromise the integrity of the file system database. For example, referring to FIG. 1, executing object 108 may attempt to modify the contents of database 122 in order to conceal its existence and/or actions as recorded in the database, or it may attempt to disable or alter security software 120 in order to avoid future detection by the software. Although operating systems often have user permissions to prevent unauthorized file modifications, malware can sometimes circumvent these safeguards by exploiting security holes to obtain administrator privileges, especially on systems where a user routinely uses an administrator account for daily use of the computer.

Accordingly, to defend against such attacks, the security software 120 preferably includes an extra layer of protection to ensure its own integrity. In one technique for providing this protection, the security software security module intercepts unauthorized write attempts by executing objects to modify a selected set of protected objects stored on the digital storage medium. Such protected objects may include, for example, the security software 120 and the system database 122, thereby ensuring that database integrity. Note that security software 120 and associated database 122 are understood to include associated data files such as DLLs and other data used by security software 120. The protected objects may be specified by a protected storage space (e.g., defined as the set of objects contained within a specified list of directories). The protection may be implemented, for example, by blocking modification of objects within a protected storage space by executables that are stored outside the protected storage space. Thus, the security software 120 is authorized to modify database 122, and is also authorized to modify itself, e.g., for the purposes of performing a self-controlled update of the security software. Attempts to modify security software 120 or database 122 that originate from any other executable will be blocked.

In addition to illicitly modifying the security software, malware may also corrupt various system executables and application programs. For instance, a legitimate program that routinely runs (e.g., explorer or dir) could be replaced by a fraudulent executable that starts malware, then runs the true program. To help prevent such corruptions, the protection mechanism described above may be extended to provide similar protection for operating system executables, DLLs, and registry items so that they are not corrupted by malware. For example, Windows has a registry item whose elements (DLLs) are automatically injected into every process when it is started. Protection of these elements prevents malware from adding DLLs to this list. Additionally, extended protection may be provided for selected application programs and associated files such as DLLs, preferences, settings, templates, resources, and helper objects. This extended protection may be implemented by defining one or more secondary protected spaces and corresponding executables authorized to modify objects within those respective spaces (e.g., Microsoft hotfixes would be given authorization to modify system executables). If the security software detects an unauthorized attempt to modify the protected objects, it can, depending upon user preferences, warn the user and proceed with the modification only after receiving user authorization or simply record the modification in a log file. Additionally, the security software may save a copy of the original executable in a protected backup location in order to facilitate reversing the modification at a later time. Optionally, this feature may be extended to apply to any selected group of files (whether protected or not) as they are modified. The security software thus provides an automatic backup of all the selected files, which can be used to restore the objects to their prior state if desired.

Another way malware may attempt to disable the security software is to prevent the driver from installing on system start-up by modifying system registry items. On system start-up, a selected set of registry items determines the drivers to be loaded and executed. If malware were able to modify or remove the registry item for the security software, then the security software would not be executed on the next system start-up. With the security software thus neutralized, malware would no longer be detected and intercepted. Accordingly, embodiments of the present invention preferably prevent unauthorized attempts to neutralize the driver-level security system security module. For example, the system API call used for modifying registry items may be modified to prevent unauthorized registry changes. Authorization may be determined by a list of authorized executables, and/or by manual user authorization provided in response to a warning displayed to the user that a process is attempting to modify a registry item. This protection may be limited to the security software registry item, or may be extended to provide protection for a selected list of other registry items as well.

Another way malware may potentially circumvent detection by the security software security module is to install its own driver-level file system filter at a level below that of the security software. Because it would operate at a deeper level, the malware's file system filter could effectively by-pass and thereby neutralize the security system's file system filter. Accordingly, preferred embodiments of the security software include intercepting unauthorized attempts to install executables, such as file system filters, that intercept attempts to write data to the digital storage medium. If such an installation attempt is detected, the security software allows installation of the executable only when proper authorization is provided. Authorization may be provided, for example, by checking for a digital signature from an authorized entity, checking a list of known acceptable file system filters, and/or receiving manual user authorization provided in response to a warning displayed to the user that a process is attempting to install a driver-level file system filter. Preferably, a warning is displayed to the user only if other attempts to authorize the installation fail.

Identifying and Classifying Packages

Using techniques described above, embodiments of the security software are able to create an accurate file system database and ensure its integrity. Because this database contains causally structured information about all file modifications on the system, it provides the foundation for subsequently identifying and removing malware. To facilitate this process, the security software preferably includes supplementary tools and routines, one of which involves techniques for organizing and/or analyzing the database.

Although the database is created with a tree structure representing the causal relationship between objects, for the purposes of identifying and neutralizing malware it is beneficial to provide an additional layer of organization. Specifically, embodiments of the security software preferably include a routine to automatically identify objects associated with a single software package. These descendents of these identified objects define one or more corresponding sub-trees of the database, called installation trees. The database may then be organized as collections of distinct software packages associated with corresponding installation trees.

Various techniques may be used to identify an object as associated with a new software package. Indicators that an object may likely be part of a new software package include, for example, downloading the object over a network and executing it, or copying the object from an external storage medium and executing it. An object is likely associated with a new package if it is created by a package manager installation, if an executable object installs itself or registers itself with the package manager, or if an object that does not already belong to a package creates another object that is then executed. On the other hand, if an object that already belongs to an existing package creates another object, then the created object is, by default, associated with the existing package. The security software may also allow the user to manually define packages.

It is useful to assign a recognizable name to a newly identified package. One technique for assigning a name to a new package compares the objects associated with the new package to a list of file names associated with known package names (e.g., including files belonging to various known legitimate and illegitimate software packages). If there is a match, or near-match between the file names, then the new package may be positively identified and assigned the appropriate known package name. To provide additional confidence, rather than (or in addition to) comparing file names, the match can be based on a comparison between hashes of the files themselves, and/or on a comparison between the causal structure of the files. Additionally, if an originating URL is associated with the new package, it can be compared with URLs associated with packages in the list of known packages.

The above techniques for assigning names to new packages may also be used to identify existing packages. In particular, when the security software is first installed on a computer system, there is pre-existing software already installed on the system, such as operating system software and any number of previously installed application software packages. Accordingly, the security software preferably includes a database initialization procedure that scans the existing files and attempts to identify and name packages. For these purposes, it is beneficial for the list of known software files to include standard system software files. The security software may also allow the user to manually specify package names, e.g., for files that the database initialization scan is unable to identify. The database initialization is preferably performed automatically when the security software is launched for the first time after installation. Additionally, the scan may also be performed at any later time, either automatically at specified times or by manual user command.

In addition to identifying packages in the database, preferred embodiments of the security software also perform automatic classification of packages. For example, packages may be classified according to their likelihood of being malware. The classification may use categories such as "Confirmed Malware", "Suspected Malware", "Unknown", and "OK". If a package matches a known legitimate software package, as described above, then the package may be classified as "OK". On the other hand, a package may be classified as "Suspected Malware" if an object in the package attempts to modify the memory space assigned to another executing object.

In some embodiments, the security software may classify individual objects in addition to or instead of classifying entire packages. For example, objects may be classified as "OK" or "Suspected Malware" based on a predetermined profile of object properties. One such property could be whether or not the object belongs to a package registered with the operating system. If the package is unregistered, then the object may be classified as "Suspected Malware". The profile of object properties may depend on the package that is modifying or creating the object. For example, some applications routinely create files with specific, well-known properties. These properties define a profile for objects modified or created by such applications. If an object modified by such an application does not conform to the profile for that application, then there was likely an instance of code injection, and the objects may be classified as "Suspected Malware".

In some embodiments, the security software may classify a package (or parts of a package) as "Suspected Malware" if the package erroneously reports that an object belonging to the package has been removed during an uninstallation of the package. In other words, the package claims it has removed files that actually were not removed. The security software, for example, may monitor uninstallations that take place, after an installation compare a list of reportedly uninstalled files with a list of existing files from the system database, and classify the package (or remaining parts thereof) as "Suspected Malware" if the comparison results in a mis-match. In addition, the security software can mark the originating URL of the package as a suspected source of malware. This classification information about the package and the URL may be sent over a data network to an aggregating server from which it may be distributed to other computers to assist in identifying the malware on those computers. The classification information may include various types of information including, for example, a URL from which the malware originated, a hash of the malware, file names associated with the malware, etc.

The security software may also allow the user to manually classify objects and/or packages. Preferably, the database initialization procedure described earlier also includes classification of the identified files and/or packages.

Quasi-Safe Mode and Neutralizing Malware

In severe cases, malware has so thoroughly infected the computer that it interferes with normal software applications to the extent that they become unresponsive and practically unusable. In such cases, conventional antivirus software is effectively disabled as well. Users of such crippled systems previously have had little choice but to erase the computer's hard drive and re-install a fresh copy of their operating system and all application programs. Worse yet, they often lose all their personal files in the process. To avoid such problems, embodiments of the security software of the present invention preferably enable the computer operating system to be switched into a quasi-safe mode that restricts the execution of a selected collection of objects. Switching to quasi-safe mode does not require restarting the operating system. In most cases, the selected collection of objects whose execution is restricted includes all non-essential objects, i.e., objects other than core processes, services, and drivers required for basic functioning of the operating system. The restriction of execution may take the form of killing objects in the selected collection of objects that are currently executing and/or preventing initiation of execution of any executable objects in the selected collection of objects. In practice, the objects may be prevented from execution by various techniques such as modifying the API call that is used to create processes, detecting all starting processes and immediately killing them, or changing the permissions of executable files so that they are no longer executable (e.g., by modifying the API function used to return file permissions).

Embodiments of the security software preferably allow a suitably authorized local or remote user to easily neutralize selected collections of objects (e.g., an entire software package or a portion thereof). Preferably, the user may select from one of several degrees of neutralization. The first and least disruptive form of neutralization simply involves disabling any automatic execution of all executables in the selected collection. This may include, for example, moving or deleting any auto-links, auto-start registry keys, helper objects registry keys, short-cuts, and other references to the executables associated with the selected collection of objects. A second form of neutralization takes the additional step of deleting the selected collection of objects from their current locations and saving copies to a quarantined (and preferably protected) location (i.e., moving the objects). This allows them to be restored, if desired. The selected collection of objects in this case may include, for example, all executables associated with one or more software packages. Optionally, other associated non-executable objects may also be quarantined. Finally, the most severe form of neutralization is to uninstall and delete the selected collection of objects entirely. If an entire software package installation tree is selected, this type of neutralization preferably includes an option to reduce the objects in the selected set to a registered list of objects belonging to the selected software package plus any remaining objects in the selected set that have extensions indicating they are executable or that have been auto-executed. Any remaining executable objects in the set are moved to a quarantine location, and non-executables are not moved. This option is provided so that the uninstallation does not delete desired files associated with the package installation tree such as user documents created with an application program in the package. This uninstallation process may also optionally use an existing system uninstaller program.

Remote Communication and Control

Embodiments of the security software preferably include mechanisms for remote communication and/or remote control. The remote communication may include the transmission over a data network of some or all of the information stored in the system database to a remote computer. For example, information about installed packages and/or suspected malware and/or URLs of suspected malware may be sent to a remote aggregator computer and/or a remote system administrator computer for analysis. Such transmissions may be sent in response to a local or remote user request, or automatically in response to a schedule or an event such as a classification of a file or package as potential or confirmed malware. Conversely, the remote communication may include receiving over the data network from a remote computer updates to various lists used by the security software. The updates may include, for example, information from an aggregator computer or a system administrator computer about known software packages and known malware used by the security software for identifying, naming, and classifying packages and objects. For example, the aggregator may send a computer a list of URLs that are suspected or confirmed sources of malware, and the computer may then mark any packages originating from those URLs as suspected malware. Or the aggregator may send a computer information about suspected malware packages which may then be used to identify and classify such packages.

Forms of remote control may include receiving and executing a command from a remote computer, e.g., a remote system administrator computer. Such commands may include, for example, a command to neutralize a software package on the computer, a command to install a specified software package, a command to retrieve database contents, a command to activate quasi-safe mode, or a command to search the computer for objects matching a specified profile. By providing the capability for remote control, the security software enables a single network administrator to monitor a collection of computers and neutralize malware as needed. As with any remote administration, the remote control is preferably performed using highly secure encryption and authentication.

User Interface

Figure 4:
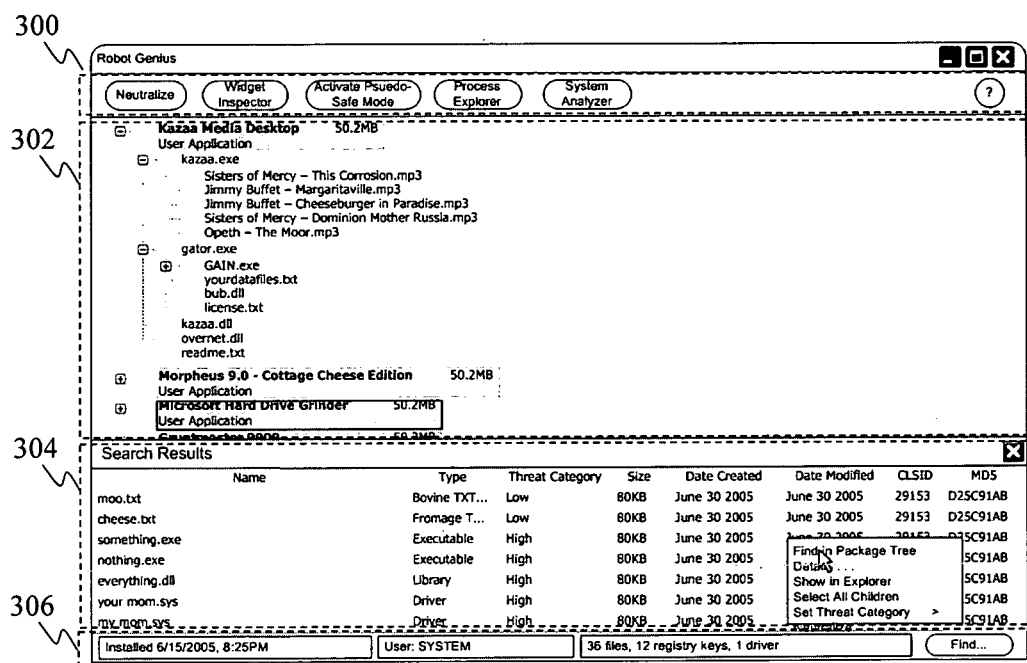
FIG. 4 is a picture of a user interface window used with security software in accordance with an embodiment of the invention.

Embodiments of the security software are preferably provided with a user interface which may include a command-line interface and/or a graphical user interface (GUI), as illustrated in FIG. 4. The GUI has a window containing a row of control buttons 300, a file and package structured view 302, a file list view 304, and a status line 306 for displaying application and window information. The control buttons 300 allow the user to activate various features of the security software, e.g., to neutralize items selected in the structured view 302 and to turn on/off quasi-safe mode, as described earlier. A control button in the user interface allows a process viewer to be activated, e.g., in another window. The process viewer analyzes the system and displays suspicious active processes such as processes that restart each other (which can be a sign of malware activity). Another control button in the user interface allows a widget inspector to be activated. The activation of this tool will change the mouse cursor from an arrow to a target icon. This tool displays the process responsible for creating a window currently selected by the target, as well as the package (if any) associated with the process. This tool is useful for identifying the malware process responsible for creating pop-up windows or elements contained in pop-up windows.

The GUI displays in structured view 302 a hierarchically organized tree list of both registered and unregistered packages, allowing a user to expand each item to reveal its children or to close each item to hide its children. The data is preferably displayed to reflect the causal tree structure of the database, as enhanced by package organization and classification. Root elements are typically base installed packages or installer files the user has directly executed. Each item may be displayed with a color-coded associated malware threat category. The user can select an entire tree or any sub-tree, as well as individually select and deselect individual items or sub-trees. The items may be displayed in a faded manner to indicate they have been neutralized.

The GUI also displays in list view 304 a linear, flat list of objects in the database. This list can be sorted or searched according to various attributes of the objects such as name, file type, threat category, size, creation date, and modification date. Various other useful views may also be provided, either as specified by the security software or as defined by user customization. For example, files and packages may be viewed by malware threat classification, installation date, URL origin, and/or by various other properties.

The invention claimed is:

1. A computer-implemented method for combating malware on a computer comprising a CPU, a memory, and a digital storage medium, the method comprising:
   a) monitoring all attempts by any software executing on the computer to write data to the digital storage medium;
   b) recording details of the attempts in a system database; wherein the details of the attempts comprise
      i) a first object identifier corresponding to an executable object attempting to write the data,
      ii) a second object identifier corresponding to a target object stored on the digital storage medium that the executable object is attempting to write data to, and
      iii) a third object identifier corresponding to a parent executable object that initiated execution of the executable object attempting to write the data,
      wherein the system database has a causal tree structure, where branch points represent parent executable objects from which child derivative objects are created and leaves represent child objects that have no derivative object;
   c) organizing the system database into software packages comprising groups of associated objects, wherein the software packages correspond to sub-trees of the causal tree structure;
   d) intercepting modification by executing objects to the memory allocated to other executing objects, and authorizing the modification for executing objects that are included in a predetermined exempt list stored in the system database; and
   e) intercepting unauthorized attempts by executing objects to modify a selected set of protected objects stored on the digital storage medium, wherein the selected set of protected objects comprises the system database.

2. The method of claim 1 wherein the monitoring is performed by a file storage system filter installed at a driver level of an operating system of the computer.

3. The method of claim 1 wherein the intercepting modification comprises executing a kernel-level process filter.

4. The method of claim 1 wherein the intercepting modification comprises executing a modified API call.

5. The method of claim 1 further comprising intercepting an attempt initiated by an executing object to write to any objects whenever the executing object has a buffer overflow.

6. The method of claim 5 further comprising checking a system call stack for a buffer overflow condition.

7. The method of claim 1 further comprising intercepting an attempt initiated by an executing object to open pop-up windows whenever the executing object has a buffer overflow.

8. The method of claim 1 further comprising intercepting an attempt initiated by an executing object to write to any objects whenever the executing object exists in a data segment of memory.

9. The method of claim 1 further comprising comparing the first object identifier to a predetermined list of known helper objects.

10. The method of claim 1 wherein the system database is stored in XML format.

11. The method of claim 1 wherein intercepting unauthorized attempts by executing objects to modify a selected set of protected objects comprises preventing executable objects stored outside a protected storage space from modifying objects in the protected storage space.

12. The method of claim 1 wherein the selected set of protected objects comprises a dynamic linked library.

13. The method of claim 1 wherein the selected set of protected objects comprises executable objects.

14. The method of claim 13 wherein the executable objects comprise executable objects associated with an operating system of the computer.

15. The method of claim 13 wherein the executable objects comprise objects associated with selected application programs installed on the computer.

16. The method of claim 11 wherein the protected storage space is a list of one or more directories on the digital storage medium.

17. The method of claim 1 further comprising preventing unauthorized attempts to neutralize a protected driver.

18. The method of claim 17 wherein preventing unauthorized attempts to neutralize a protected driver comprises modifying API calls to prevent unauthorized registry changes.

19. The method of claim 1 further comprising intercepting unauthorized attempts to install executables that intercept attempts to write data to the digital storage medium.

20. The method of claim 19 wherein intercepting unauthorized attempts to install executables that intercept attempts to write data to the digital storage medium comprises checking for a digital signature from an authorized entity prior to allowing installation of an executable that intercepts attempts to write data to the digital storage medium.

21. The method of claim 1 further comprising automatically backing up objects stored on the digital storage medium if the objects are modified.

22. The method of claim 1 further comprising using a backup to restore objects stored on the digital storage medium to a prior state.

23. The method of claim 1 wherein organizing the system database into software packages comprises identifying a new software package whenever an object is downloaded over a network and executed.

24. The method of claim 1 wherein organizing the system database into software packages comprises identifying a new software package whenever an object is copied from an external digital storage medium and executed.

25. The method of claim 1 wherein organizing the system database into software packages comprises identifying a new software package if a package manager creates a collection of installed objects.

26. The method of claim 1 wherein organizing the system database into software packages comprises identifying a new software package if an executable object installs itself.

27. The method of claim 1 wherein organizing the system database into software packages comprises identifying a new software package if an object registers itself with a package manager.

28. The method of claim 1 wherein organizing the system database into software packages comprises identifying a new software package if a first object unassociated with any existing package creates a second object that is executed.

29. The method of claim 1 wherein organizing the system database into software packages comprises associating a new object with an existing software package if another object in the existing software package created the new object.

30. The method of claim 1 further comprising categorizing a software package as suspected malware if an object in the software package attempts to modify a memory space assigned to another executing object.

31. The method of claim 1 wherein organizing the system database into software packages comprises comparing the system database with a reference database containing known software packages and associated objects having a causal tree structure.

32. The method of claim 1 wherein organizing the system database into software packages comprises assigning names to the packages.

33. The method of claim 32 wherein assigning names to the packages comprises comparing a hash of files associated with the package with a database of known hashes.

34. The method of claim 32 wherein assigning names to the packages comprises comparing a URL of files associated with the package with a database of known URLs.

35. The method of claim 1 wherein recording details of the attempts to write data further comprises recording a URL corresponding to an origin of the software program.

36. The method of claim 1 further comprising categorizing a software package as suspected malware if the package erroneously reports that an object belonging to the package has been removed during an uninstallation of the package.

37. The method of claim 1 further comprising categorizing an object as suspected malware if the object does not have properties that conform to a predetermined profile for a software package modifying or creating the object.

38. The method of claim 1 further comprising identifying pre-existing objects on the digital storage medium, and initializing the system database to contain the identified pre-existing objects.

39. The method of claim 38 wherein identifying pre-existing objects comprises comparing a hash of files associated with the package with a database of known hashes.

40. The method of claim 1 further comprising switching to a quasi-safe mode that restricts execution of a selected collection of objects.

41. The method of claim 40 wherein switching to quasi-safe mode comprises killing objects in the selected collection of objects that are currently executing.

42. The method of claim 40 wherein switching to the quasi-safe mode comprises preventing initiation of execution of any executable objects in the selected collection of objects.

43. The method of claim 40 wherein the selected collection of objects comprises all non-essential objects.

44. The method of claim 1 further comprising neutralizing a selected collection of objects.

45. The method of claim 44 wherein neutralizing the selected collection of objects comprises moving or deleting indirect links to the objects.

46. The method of claim 44 wherein neutralizing the selected collection of objects comprises moving the objects to a quarantined location.

47. The method of claim 1 further comprising deleting objects in a registered list of objects belonging to a selected software package, deleting remaining objects associated with the selected software package that have extensions indicating they are executable or that have been auto-executed, and moving remaining executable objects associated with the selected software package to a quarantine location.

48. The method of claim 1 further comprising transmitting system database information to a remote computer.

49. The method of claim 48 wherein the system database information comprises information about installed packages.

50. The method of claim 48 wherein the system database information comprises information about suspected malware.

51. The method of claim 1 further comprising receiving and executing a command from a remote computer.

52. The method of claim 51 wherein the command from the remote computer comprises a command to remove a software package from the computer.

53. The method of claim 51 wherein the command from the remote computer comprises a command to search the computer for objects matching a specified malware profile.

54. The method of claim 1 further comprising displaying data from the system database and a set of selectable commands, and allowing a user to select a set of displayed objects and activate one of the selectable commands.

55. The method of claim 1 further comprising displaying data from the system database in an expandable tree structure allowing portions of the tree to be revealed and hidden by a user.

56. The method of claim 1 further comprising displaying data from the system database in an expandable tree structure organized by the causal tree structure of the system database.

57. The method of claim 1 further comprising displaying data from the system database in an flat, linear structure.

58. The method of claim 1 further comprising displaying data from the system database grouped according to software package.

59. The method of claim 1 further comprising displaying data from the system database grouped according to software package, together with associated categorization labels for each package.

60. The method of claim 1 further comprising displaying an identity of an executing process and associated software package that created a displayed item currently being selected by a user using a window inspector tool.

61. The method of claim 1 further comprising categorizing an object as suspected malware if the object is not part of a software package registered with the operating system.

* * * * *